US 6,664,983 B2

(12) United States Patent
Ludolph

(10) Patent No.: US 6,664,983 B2
(45) Date of Patent: Dec. 16, 2003

(54) METHOD AND APPARATUS FOR CONFIGURING SLIDING PANELS

(75) Inventor: Frank Ludolph, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/761,541

(22) Filed: Jan. 16, 2001

(65) Prior Publication Data

US 2001/0028365 A1 Oct. 11, 2001

Related U.S. Application Data

(62) Division of application No. 08/829,454, filed on Mar. 28, 1997, now abandoned.

(51) Int. Cl.[7] ................................................ G09G 5/00
(52) U.S. Cl. ...................... 345/775; 345/777; 345/778; 345/779
(58) Field of Search ................................. 345/764, 775, 345/776, 777, 795, 854, 855, 778, 779

(56) References Cited

U.S. PATENT DOCUMENTS 5,305,435 A    4/1994 Bronson .................... 345/777
5,657,049 A    8/1997 Ludolph et al. ............ 345/856
5,664,128 A  * 9/1997 Bauer ........................ 345/708
5,956,030 A  * 9/1999 Conrad et al. .............. 345/769

FOREIGN PATENT DOCUMENTS

FR        2693810      1/1994
WO     WO9297874     12/1994
WO     WO9297934     12/1994
WO     WO9351636     11/1996

* cited by examiner

*Primary Examiner*—Ba Huynh
(74) *Attorney, Agent, or Firm*—Martine & Penilla, LLP

(57) ABSTRACT

A graphical user interface (GUI) is configurable in an embodiment of the invention. A user configures sliding panels located on the edges of the GUI. A sliding panel is configured with an application that runs in the sliding panel. The sliding panel is present in the GUI in either a closed or an open representation. The sliding panel's GUI representation is determined based on the position of the user's cursor. When the cursor is within a closed sliding panel's closed representation, the sliding panel is expanded to its open representation. By moving the cursor outside the sliding panel, the user can close the panel. There is no need for the user to consciously manage the elements in the GUI. The elements are managed based on the configuration information supplied by the user and the information available at runtime.

20 Claims, 11 Drawing Sheets

METHOD AND APPARATUS FOR CONFIGURING SLIDING PANELS

This is a divisional of application Ser. No. 08/829,454 filed Mar. 28, 1997 abandoned.

BACKGROUND OF THE INVENTION

1. Field of the Invention

This invention relates to graphical user interfaces (GUIs), and, more particularly, to applications configured to be displayed on sliding panels in a GUI.

2. Background Art

In computer systems, a GUI is used to present information to a user. In a personal computer environment, analogies are made between the items in a GUI and a person's desk. For example, the initial screen that is displayed when a computer system is booted is typically referred to as a desktop. The desktop can consist of windows that overlap, folders, documents, a trash can, etc. As with a person's desk, a computer system's desktop can easily become cluttered making it difficult to find something located on the desktop.

Items such as an executable software program or a file can be represented on the desktop as icons. The user can initiate the software program by clicking (e.g., double or single click) on the icon using a mouse button. When a software program is initiated, an application window is opened that is used to display output and enter input associated with the application. The application window overlays the information already being displayed on the desktop. Such information may include icons displayed on the desktop or another application's window.

A GUI element such as an icon, window, or desktop can be activated or deactivated. When an element is selected by a single click of the mouse button, it becomes active. An activated element can be deactivated by selecting another element. To select an element, the element must be visible on the desktop. If it is covered by another element, it is impossible for the user to select the element. The element must first be found before it can be activated. This involves rearranging the items on the desktop to uncover the desired element.

Various techniques have been developed to make an element accessible. For example, in a process referred to as minimization, the size of a window can be reduced. A window can be minimized to the point that it is represented as an icon on the desktop, for example. A window can also be removed by closing it. Further, an element can be rearranged on the desktop. Windows can be dragged from one location on the desktop to another, for example. The shuffling or resizing of elements on the desktop is time consuming. It can also be frustrating to the user particularly when the user needs to access to the element frequently or quickly.

Menus (such pop-up or pull-down menus) have also been used to make elements more accessible. The user clicks on a menu icon which causes the menu to be displayed. The user can click on an item in the menu to select the item. These menus are pre-configured and their entries act as a pointers to such things as applications, folders or documents. In the Macintosh operating system, an apple icon in the top left-hand corner of the screen represents a menu that contains pointers to elements. To add an entry in the apple menu display, the user adds the element to an "Apple Menu Items" folder in the system's folder.

Another type of menu that is used in Windows 95 is a taskbar that exists at the bottom edge of the Windows 95 screen or desktop. The taskbar contains icons that represent open applications. To start an application, the user types in the location of the application in the system's file system, or the user selects an entry in a hierarchical menu structure (i.e., the location of the application associated with the entry has already been defined). When the application is invoked, an application window is opened on the desktop. When the application's window is minimized, an icon that represents the application remains in the taskbar. To activate the application, the user moves the cursor that is displayed on the desktop (using the mouse) to the taskbar. An option that exists in Windows 95 allows the user to hide the taskbar or remove it from sight until it is needed. The taskbar appears as a thin gray line at the bottom of the display, if this option is chosen.

The menus including the Apple menu used in the Macintosh operating system and the Windows 95 taskbar have a unitary function. In the case of the Apple menu, the menu holds pointers to an element stored in the operating system's file system. The Windows 95 taskbar holds pointers to suspended applications. It is impossible, for example, to configure the menus to run an application on the menu. In the prior art, a menu has a unitary function that is hardwired and cannot be configured by a user.

Further, in the prior art, a menu does not manage the element on a desktop to reduce the clutter. It is still necessary for a user to manage the elements on the desktop by, for example, minimizing, maximizing or otherwise hiding windows and rearranging desktop elements.

SUMMARY OF THE INVENTION

In one embodiment of the invention, the user configures panels on a computer system's GUI. The user's configuration is used to generate and manage the computer system's GUI.

In one embodiment of the invention, an application or information is placed on a sliding panel attached to an edge of the GUI. The sliding panel can be displayed in a closed representation such as a thin column along an edge of the GUI. When the mouse pointer (e.g., cursor) touches the configured edge, the panel slides into view thereby allowing the user to see the information and interact with the application configured for the panel. The panel automatically closes when the mouse pointer moves outside the panel. Multiple panels can be attached to each edge of the display. There is no need for the user to click on the sliding panel's GUI representation to either open or close it. The sliding panel's GUI representation is determined based on the position of the user's cursor. There is no need for the user to consciously manage the elements in the GUI. The elements are managed based on the configuration information supplied by the user.

A configuration user interface (UI) of a selector module is used to configure a sliding panel. The user can select an edge on which a panel exists or a new panel is to be defined. If multiple panels are configured on an edge, the user can select the desired panel. The user selects properties for the sliding panel such as the application that runs on the sliding panel, the panel's background color, and the criteria for opening and closing the panel. A panel's configuration is saved in, for example, a configuration file. The selector module accesses a panel's configuration file to display the sliding panel in the computer system's GUI.

DETAILED DESCRIPTION OF THE INVENTION

A method and apparatus for configuring sliding panels is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
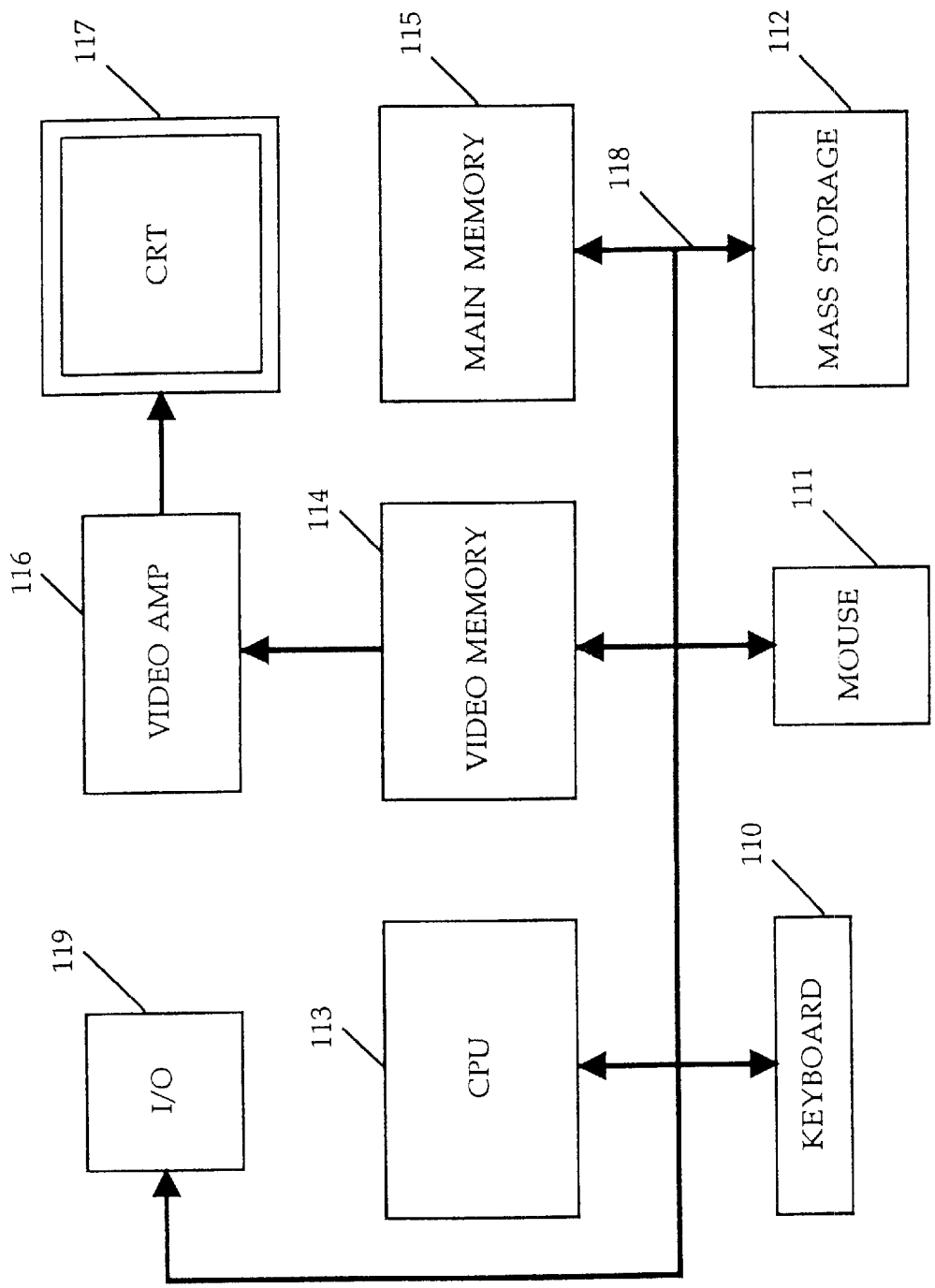
FIG. 1 provides an example of a general purpose computer that can be used in one embodiment of the invention.

The present invention can be implemented on a general purpose computer such as illustrated in FIG. 1. A keyboard 110 and mouse 111 are coupled to a bi-directional system bus 118. The keyboard and mouse are for introducing user input to the computer system and communicating that user input to CPU 113. The computer system of FIG. 1 also includes a video memory 114, main memory 115 and mass storage 112, all coupled to bi-directional system bus 118 along with keyboard 110, mouse 111 and CPU 113. The mass storage 112 may include both fixed and removable media, such as magnetic, optical or magnetic optical storage systems or any other available mass storage technology. Bus 118 may contain, for example, 32 address lines for addressing video memory 114 or main memory 115. The system bus 118 also includes, for example, a 32-bit DATA bus for transferring DATA between and among the components, such as CPU 113, main memory 115, video memory 114 and mass storage 112. Alternatively, multiplex DATA/address lines may be used instead of separate DATA and address lines.

In the preferred embodiment of this invention, the CPU 113 is a 32-bit microprocessor manufactured by Motorola, such as the Power PC (e.g., 60x) processor, a 80×86 microprocessor manufactured by Intel, or a SPARC microprocessor. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable means. This circuitry converts pixel DATA stored in video memory 114 to a raster signal suitable for use by monitor 117. Monitor 117 is a type of monitor suitable for displaying graphic images.

The computer system described above is for purposes of example only. The present invention may be implemented in any type of computer system or programming or processing environment.

A graphical user interface (GUI) is configurable using embodiments of the invention. A user configures sliding panels located on the edges of the GUI. A sliding panel is configured to contain an application that runs in the sliding panel. An application that runs in a sliding panel can be, for example, a container application that contains GUI elements and provides functionality for managing the contained elements. Examples of a container application include drawer and gallery applications described below.

The user can configure a sliding panel to contain an application that could otherwise run in a window of the GUI. For example, a sliding panel can be configured to run a calendar viewer for viewing and updating a user's calendar. The calendar viewer runs in the sliding panel instead of a prior art window. The calendar viewer is always accessible by moving the cursor to the sliding panel along an edge in the GUI.

A configuration UI of an embodiment of the invention is used to configure a sliding panel by specifying the panel's properties including the application. A menu is provided in a configuration dialog that contains entries identifying possible applications. In addition to the entries in the configuration dialog, the user can specify a path (e.g., a URL) to an application.

In the preferred embodiment, the applications that run in the sliding panels are written in a language such as Java. Thus, an application is a Java-based applet or a Java Bean. A Java Bean is a reusable, distributable Java software component. The Java programming language development kit is available from Sun Microsystems, Inc.

Figure 2:
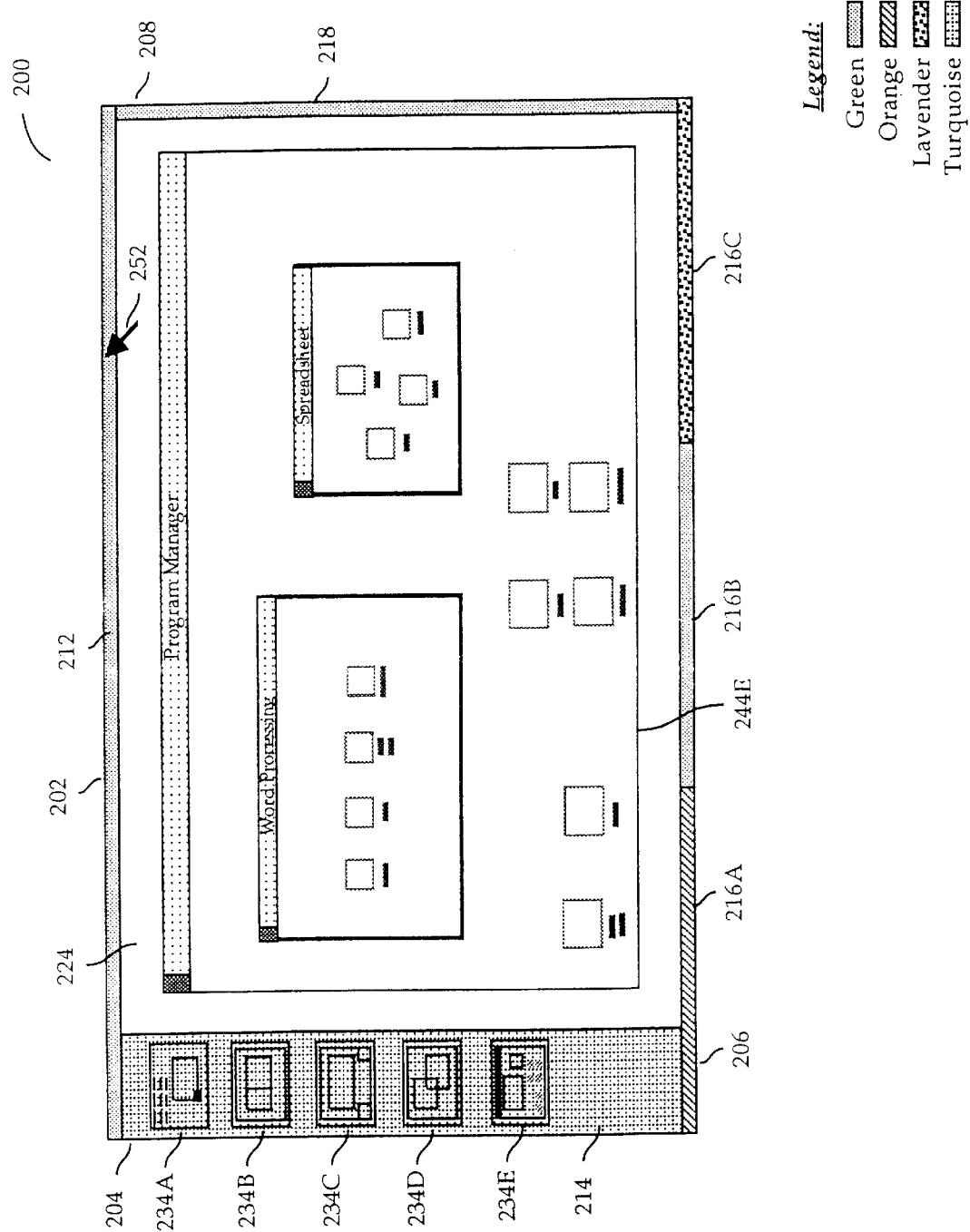
FIG. 2 provides an example of a GUI having sliding panels according to one embodiment of the invention.

FIG. 2 provides an example of a GUI having sliding panels according to one embodiment of the invention. GUI 200 includes display area 224. Display area 224 can display one or more windows such as window 244E. GUI 200 has edges 202, 204, 206, and 208 that can be configured to hold panels. In the preferred embodiment, edge 204 is configured to hold switch 214. Switch 214 includes icons 234A–234E that represent workspaces, and are selectable to move from one workspace to another.

A workspace contains a set or group of windows. For example, the windows in a Windows 95 environment are considered a workspace. When a user switches to a different workspace, the new workspace's group of windows is displayed in display area 224. Further, the new workspace's software is activated. A currently active workspace is deactivated and its state is saved and used to re-activate the workspace.

When one of icons 234A–234E are selected, one or more windows of a workspace are displayed in display area 224. Switch 214 is used to navigate through the environments or workspaces that are available to the user. Referring to FIG. 2, a Windows 95 workspace is loaded and its group of windows is displayed in display area 224.

Edges 202, 206, and 208 can be configured to contain one or more sliding panels. A sliding panel is a GUI element that slides from an open state to a closed state. Sliding panel 212 on edge 202 is in a closed state, for example. In its closed state, sliding panel 212 is visible as a thin column along edge 202. Similarly, sliding panel 218 is positioned on edge 208. Edge 206 contains sliding panels 216A–216C.

In the preferred embodiment, a color (as illustrated in FIG. 2 using patterning) is used to identify a sliding panel.

In the closed state, the color is used in the closed representation of a sliding panel. In the open state, the color is used as the sliding panel's background color. The color is used to distinguish between panels. Further, color coding can be used to match a panel in its closed state with the panel in its open state to verify that the correct panel is opened.

A sliding panel moves between the open and closed states in response to a change in position of cursor 252. When cursor 252 moves into a closed sliding panel (e.g., cursor 252 moves inside the border representing sliding panel 212 in FIG. 2), the sliding panel opens. Unless otherwise configured, when cursor 252 moves outside an open sliding panel, the sliding panel closes.

Figure 3:
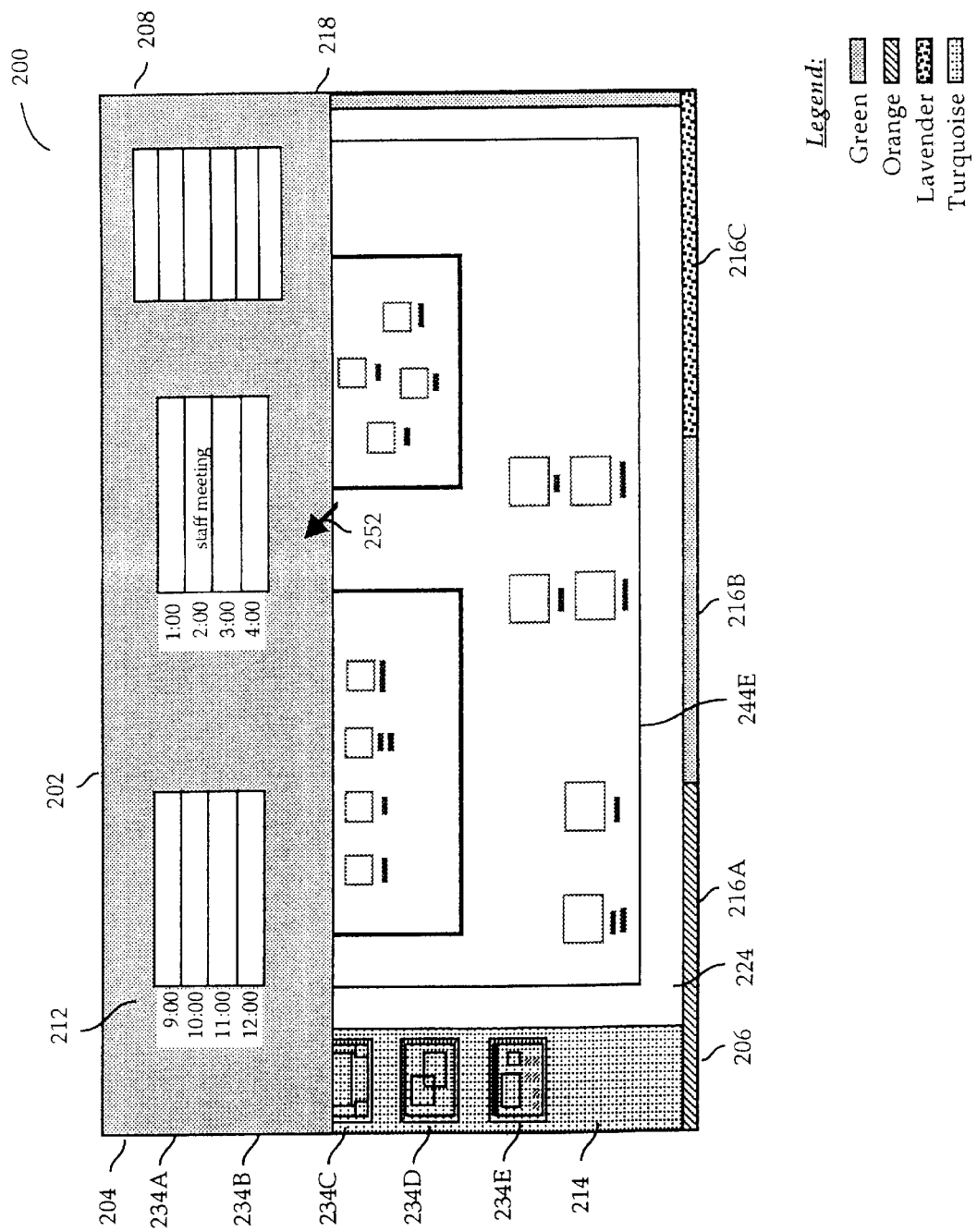
FIG. 3 provides an example of sliding panel 212 in its open state according to an embodiment of the invention.

FIG. 3 provides an example of sliding panel 212 in its open state according to an embodiment of the invention. Sliding panel 212 has been configured to contain a calendar viewer application that displays and accepts modifications to a user's calendar. In FIG. 2, slicing panel 212 is closed. To access the calendar viewer application, the user moves cursor 252 into the columnar representation of sliding panel 212 in FIG. 2. Sliding panel 212 slides open as illustrated in FIG. 3. To close sliding panel 212, the user moves cursor 252 outside sliding panel 212.

Figure 4:
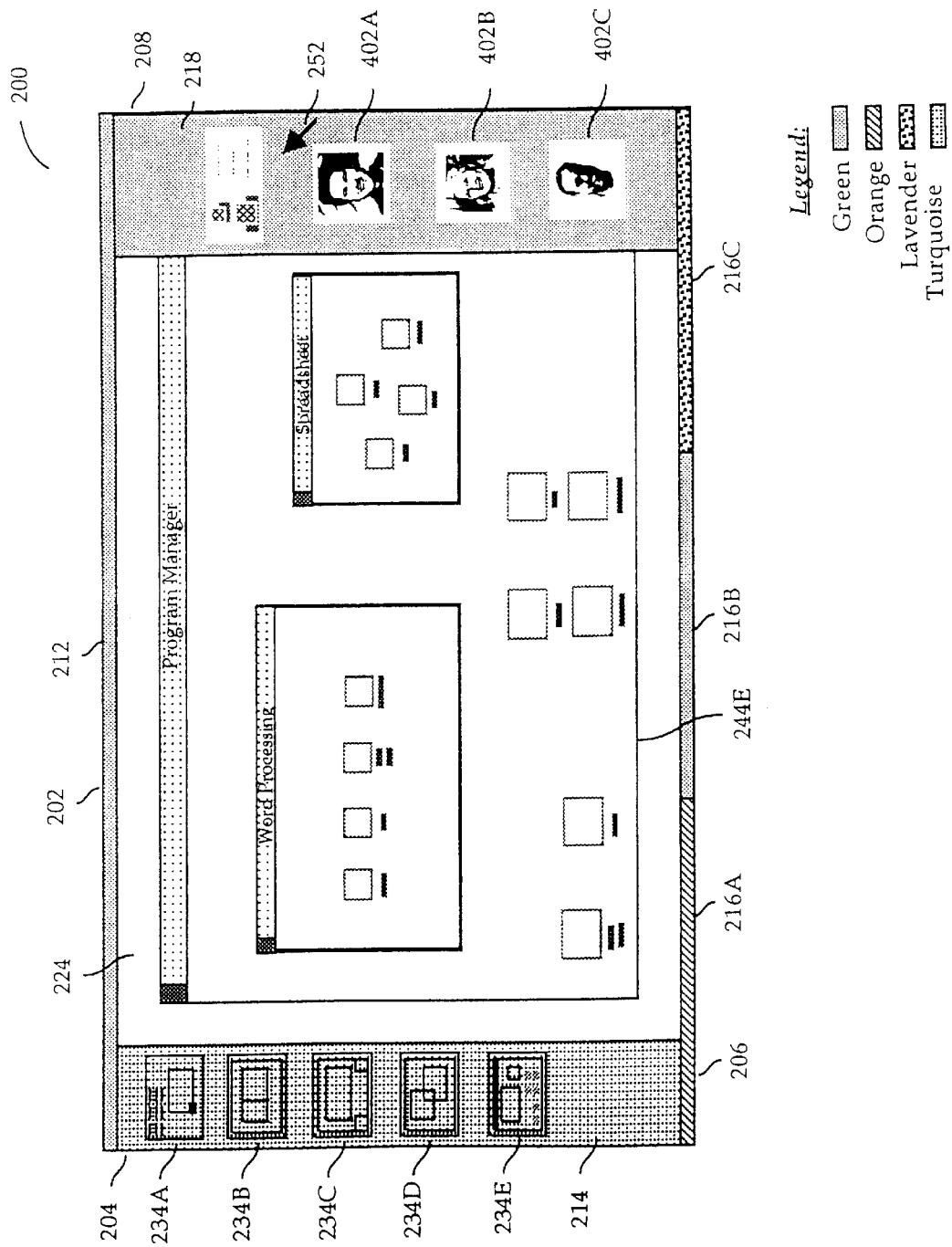
FIG. 4 provides an example of an application that runs in sliding panel 218 according to an embodiment of the invention.

Similarly, sliding panel 218 is opened by moving cursor 252 within the border of sliding panel 218. FIG. 4 provides an example of a gallery application that runs in sliding panel 218 according to an embodiment of the invention. The gallery application that contains images 402A–402C of persons. The user can depress a mouse button while the cursor is positioned over one of images 402A–402C. A pop up menu is displayed that contains a list of operations that the user can perform relative to the person whose image is displayed in one of icons 402A–402C. Examples of operations include sending mail, placing a sticky note on the persons screen, opening a network-based audio/video conference, or viewing or updating the person's calendar. Sliding panel 218 is closed when cursor 252 is moved outside the panel.

Figure 5:
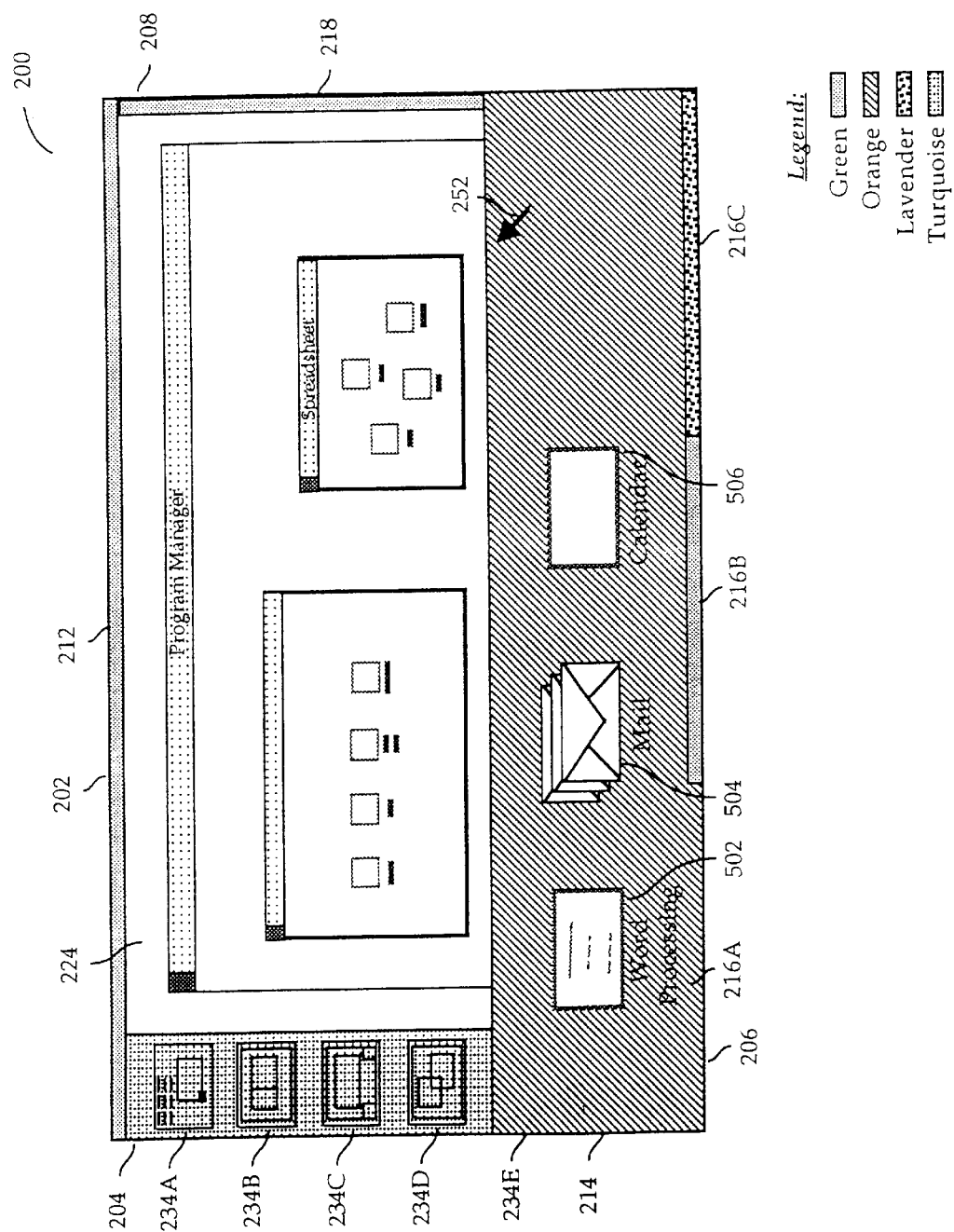
FIG. 5 provides an example of an open sliding panel configured for a drawer application according to an embodiment of the invention.

Referring to FIG. 2, multiple sliding panels (e.g., sliding panels 216A–216C) can be defined on an edge (e.g., edge 206) A column is displayed on edge 206 for each of sliding panels 216A–216C. A technique (e.g., color coding or patterning) is used to distinguish one sliding panel from another. One of sliding panels 216A–216C can be selected by moving cursor 252 into the panel's closed representation. When, for example, cursor 252 is moved into sliding panel 216A, it opens to display the output of the configured application (e.g., a drawer application). FIG. 5 provides an example of an open sliding panel configured for a drawer application according to an embodiment of the invention. The diagonal line pattern used with sliding panel 216A in FIG. 2 is used as a background for sliding panel 216A in its open state. Thus, the user can verify that the correct panel was open.

Sliding panel 216A is configured to contain a drawer application. The drawer application is a container application. Items can be moved into a drawer. An item that is moved into the drawer is depicted as an icon that is displayed in the drawer's sliding panel. Various techniques such as drag and drop or cut and paste can be used to move an item into the drawer.

The drawer application running in sliding panel 216A contains icon 502 that points to a word processing application, for example. Icons 504 and 506 represent mail and calendar applications, respectively. To access one of these applications, the user moves cursor 252 into sliding panel 216A (thereby opening the panel) and selects one of icons 502–506 (e.g., by clicking on one of icons 502–506).

A sliding panel can be configured to remain open despite the position of cursor 252 (e.g., within or without sliding panel 216A). If it is not configured to remain open, the user can close sliding panel 216A by moving cursor 252 outside sliding panel 216A. If, however, the user configures it to remain open, sliding panel 216A remains open even when cursor 252 moves outside the panel. If a sliding panel is configured to remain open, another panel can be open in front of the sliding panel that is configured to remain open Further, it is possible to configure a sliding panel to open only if cursor 252 is within the thin column that represents the panel's closed state and the mouse button is depressed.

Figure 6:
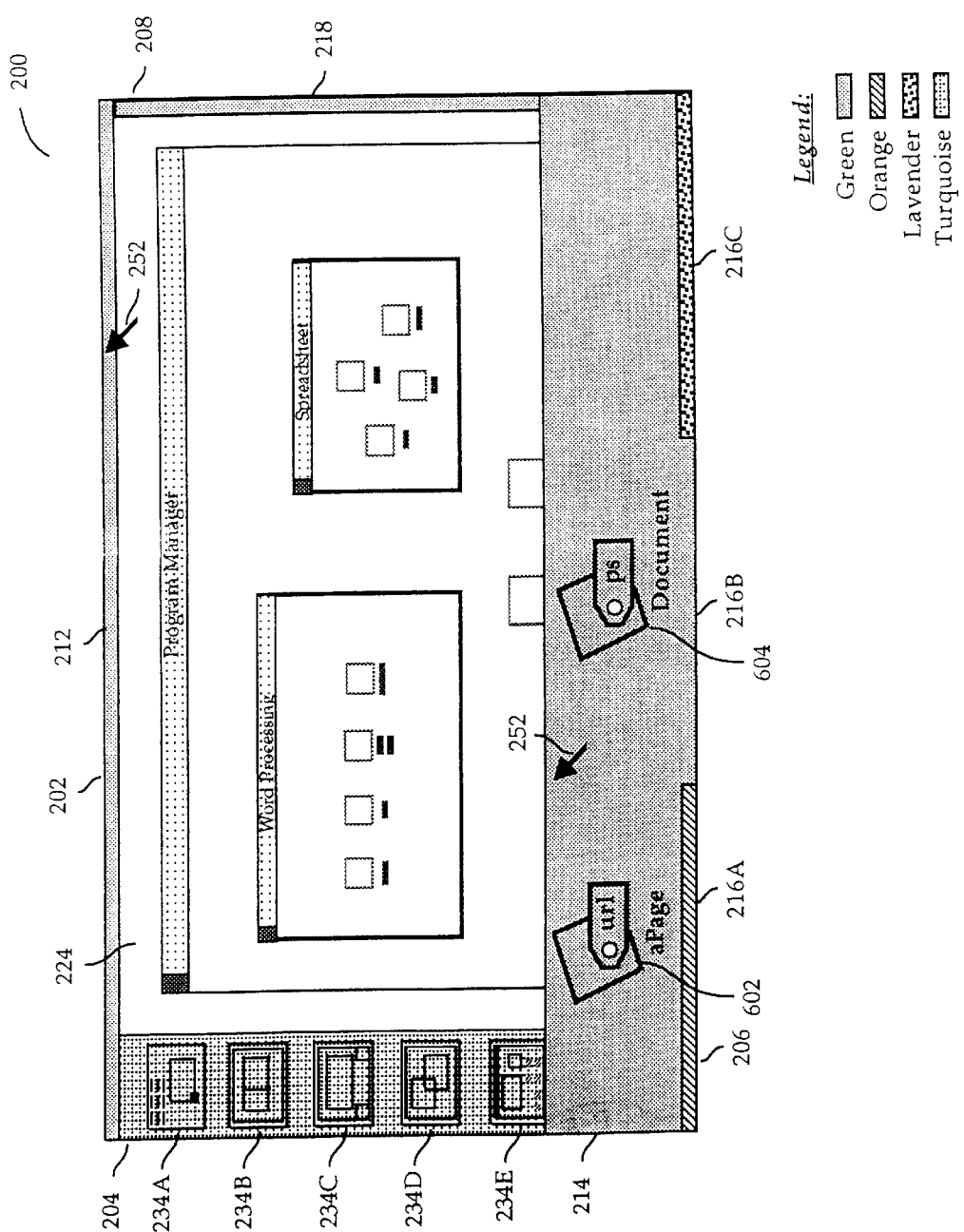
FIG. 6 illustrates the states of sliding panels after their respective opening and closing operations are completed according to an embodiment of the invention.

Sliding panels 216B–216C are visible regardless of the state of sliding panel 216A. Thus, the user can select one of sliding panels 216B–216C by moving cursor 252 into their visible portions. Sliding panel 216B is selected by moving cursor 252 into its associated shaded area. Sliding panel 216B slides open and sliding panel 216A is closed. FIG. 6 illustrates the states of sliding panels 216A and 216B after their respective opening and closing operations are completed according to an embodiment of the invention. Sliding panel 216A is closed and is represented as a column positioned along edge 206. It is, however, visible in its closed state as is sliding panel 216C. In its open state, sliding panel 216B is represented as a rectangular area that runs the length of edge 206.

Like sliding panel 216A, sliding panel 216B is configured as a drawer that contains items. The graphical representation associated with the drawer application running in sliding panel 216B includes icons 602 and 604 that represent data files. For example, icon 602 represents a Web page definition named a Page and a postscript document, Document, is represented by icon 604.

Both sliding panels 216A and 216B are configured to run the drawer application. When an application such as the drawer application is not being used, its associated sliding panel can be closed such that only a thin band is visible in GUI 200. The sliding panel is closed by moving cursor 252 off the panel. The drawer application is accessible by moving cursor 252 into the thin band that represents the closed sliding panel. At sliding panel (e.g., sliding panels 212, 216, and 21S) are accessible regardless of what is being displayed in display area 224. A panel's GUI representation is visible within GUI 200 in either an open or a closed state. Thus, there is no need to rearrange elements displayed in GUI 200 to access an application running in a sliding panel.

Figure 7A:
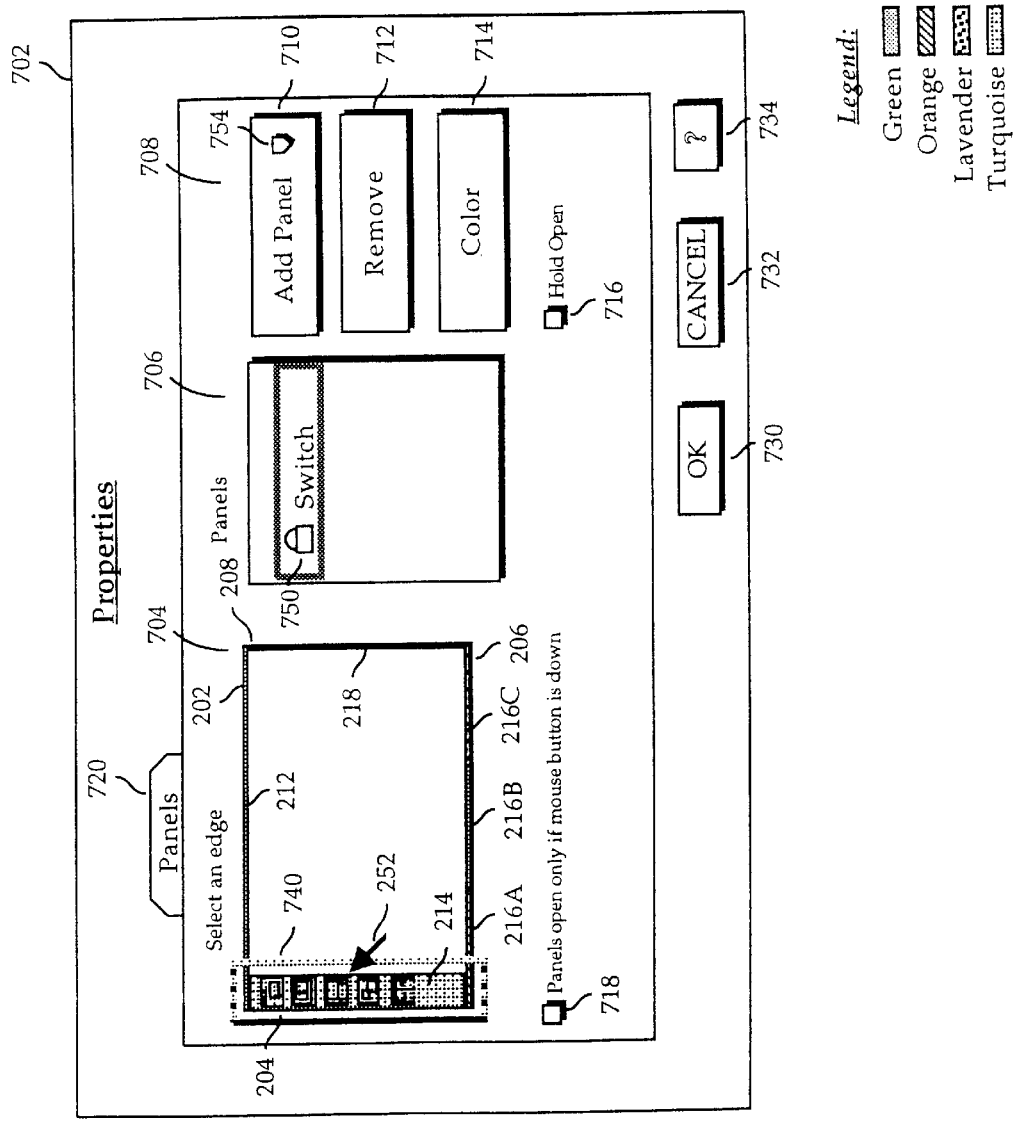
FIGS. 7A–7B illustrate a dialog in the configuration user interface according to an embodiment of the invention.
Figure 7B:
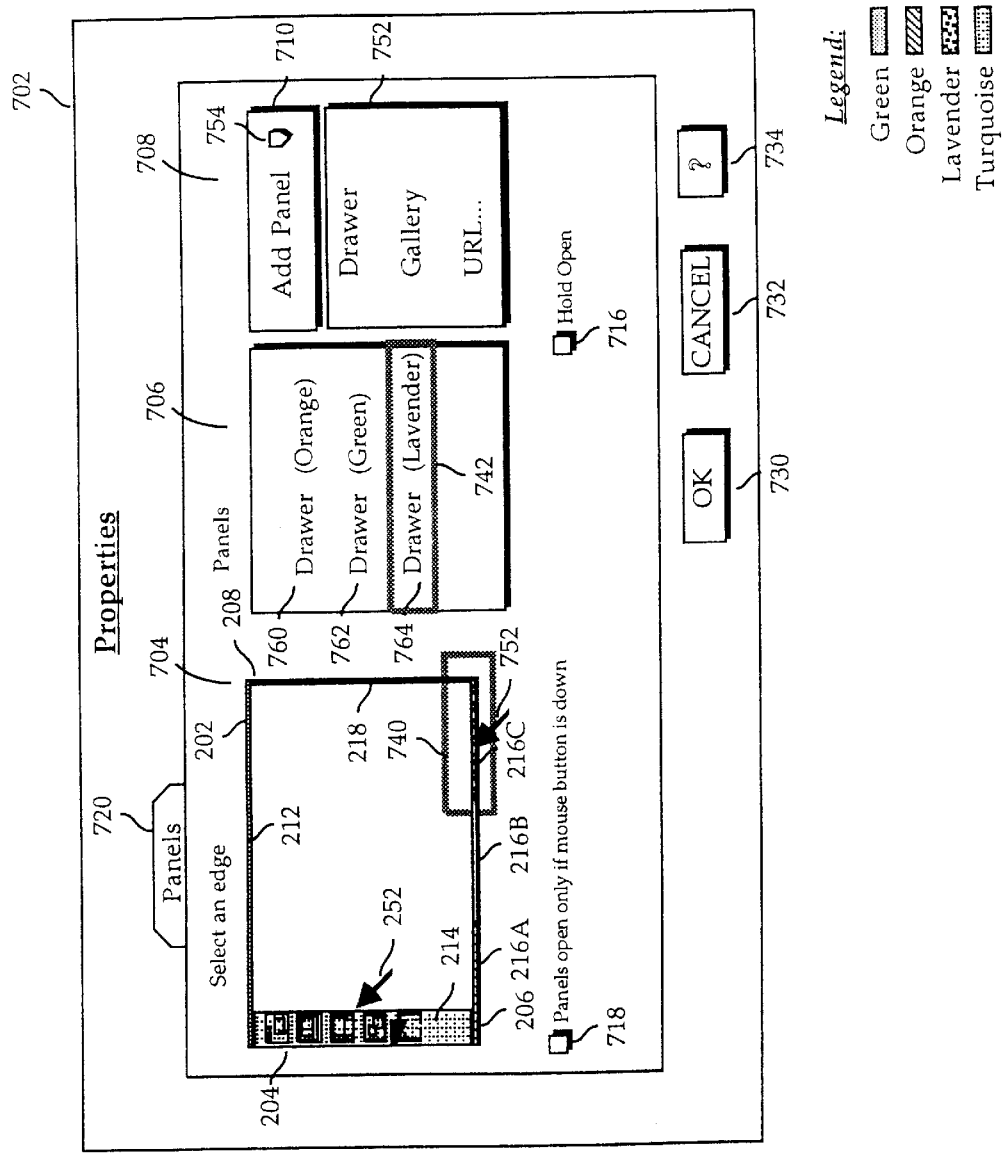

Drawer, gallery, and calendar view applications are examples of applications that can be used in embodiments of the invention. However, the scope is not limited to these applications. The sliding panels can be configured to run any application. A user uses the configuration user interface (UI) to configure a sliding panel. In the preferred embodiment, a configuration UI consisting of dialogs is used to configure a sliding panel. The configuration user interface is accessible by pressing the command button on the mouse, for example. FIGS. 7A–7B illustrate a dialog in the configuration UI in an embodiment of the invention.

Dialog 720 is used to configure (e.g., specify the properties of) a sliding panel. Dialog 720 is used to define, modify or delete sliding panels, for example. Dialog 720 includes sections 704, 706, and 708. Section 704 of dialog 720 provides a representation of GUI 200. In section 704, the user selects one of edges 202–208 using cursor 252. An edge selected by the user is highlighted in section 704 by, for example, forming box 740 around the selected edge (e.g., edge 204).

Information related to the panels along a selected edge is displayed in section 706. Entry 750 in section 706 indicates that a switch is configured for edge 204', for example. Entry 750 also indicates that the switch is locked. A locked panel is not removable from the display. It can be moved to another edge, however. The addition or removal of selectables in switch 214 is preferably performed by a system administrator. The user can select a panel for configuration by selection an entry in section 706.

Section 708 of dialog 720 provides selection boxes 710–714 that represent configuration operations. For example, a new panel can be added to an edge using box 710. Alternatively, an unlocked panel can be deleted using box 712. The background color can be set for an existing panel using box 714.

Additionally, check boxes 716 and 718 can be used to set properties of a sliding panel. The default property configuration is such that a panel opens when cursor 252 is moved inside a panel's border regardless of the positioning of a mouse button and closes when cursor 252 moves outside the panel's border. Check box 718 overrides the default such that the panel opens when cursor 252 is within the panel's border and the mouse button is depressed. A sliding panel remains open when cursor 252 is moved off the panel when check box 716 is checked.

Configuration UI 702 can be exited by selecting either button 730 or button 732. The changes made to the sliding panel configuration are saved when button 730 is used to exit configuration user interface 702. To cancel the changes specified in the current configuration session, the user selects button 732. A help button (e.g., button 734) provides additional documentation to assist in the configuration process.

As previously discussed, an edge can contain multiple panels. When the user selects one of edges 202–208, the panels configured on that edge are identified in section 706. To configure a specific panel, the user selects an entry in section 706 (entries 760–764). Entries 760–764 correspond to sliding panels 216A–216C, respectively. The selected panel is highlighted in section 704. FIG. 7B illustrates dialog 720, when the user selects sliding panel 216C. Box 740 appears as a box that encloses panel 216C in section 704 to designate it as the selected panel. Entry 764 in section 706 that corresponds to sliding panel 216C and is highlighted (e.g., box 742). Box 740 can be dragged in section 704 to select another edge or another sliding panel.

A sliding panel can be added to one of edges 202–208 by selecting button 710 (see FIG. 7A). As is indicated by down arrow 754, additional information is available by selecting button 710. The additional information is contained in box 752 (see FIG. 7B) and identifies possible applications that have been identified to configure a sliding panel. The applications identified in box 752 are by way of example only. Additional or different applications can be displayed in box 752. Box 752 can be used, for example, to provide easy access to a set of applications that an enterprise wishes its employees to use. In FIG. 7B, box 752 contains the drawer and gallery applications previously discussed. Box 752 contains selections that form a set of applications for configuring sliding panels.

In addition to the set of applications identified in box 752, box 752 includes an entry that allows a user to specify the path or address to another application that is to be configured to run in a sliding panel. The path or address can be in the form of a universal resource locator (URL) when specifying an application in the World Wide Web (WWW) environment, for example. Any type of path designation can be used with the invention, however. When a new panel application is selected, its graphic representation is displayed in section 704 (e.g., sliding panels 216A–216C, 212, and 218). Further, an entry is added to section 706.

Figure 8:
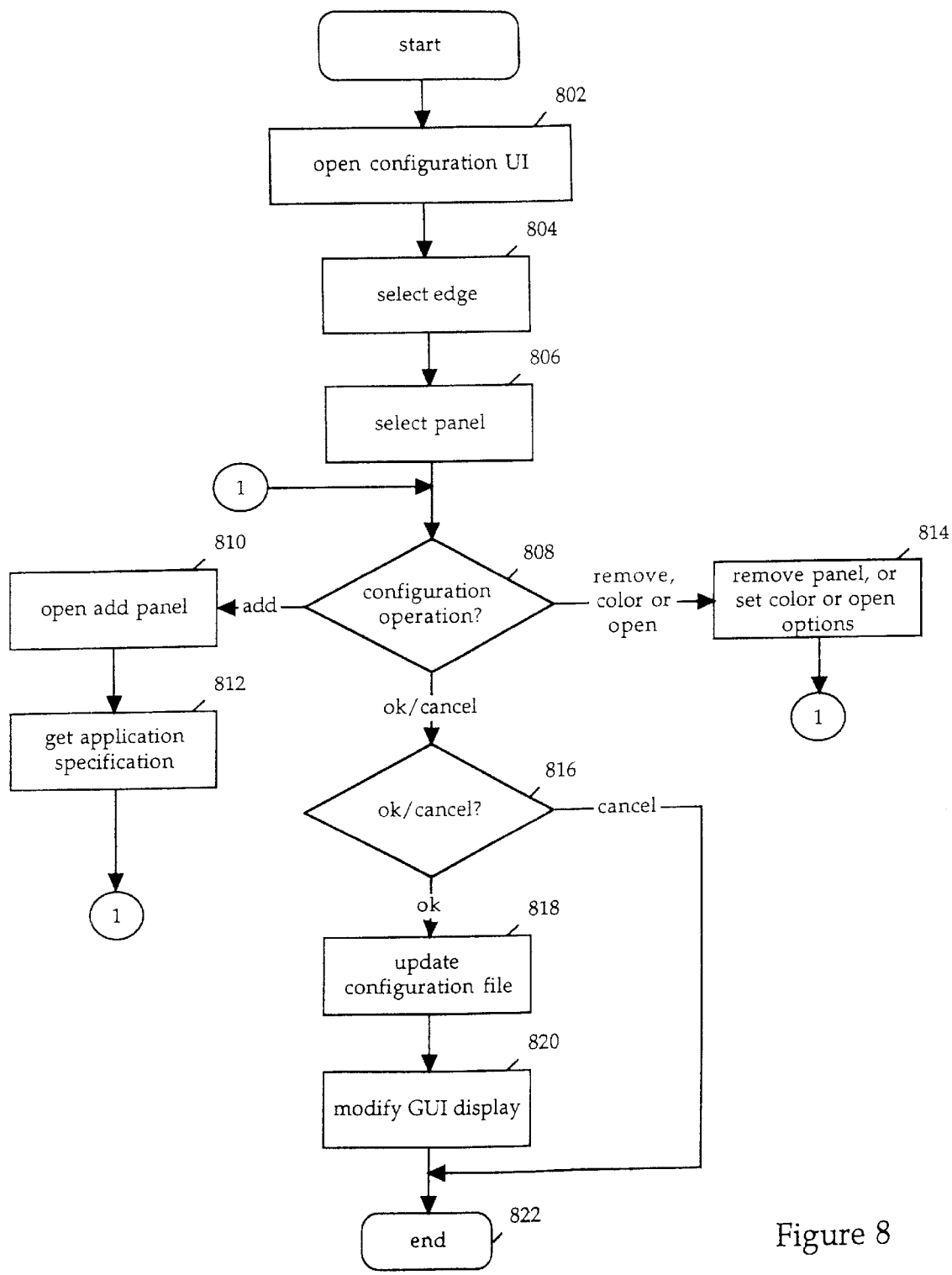
FIG. 8 provides a configuration flow according to an embodiment of the invention.

FIG. 8 provides a configuration flow according to an embodiment of the invention. At step 802, the user opens configuration user interface 702 (e.g., by depressing a button on the mouse). The user selects an edge in section 704 of dialog 720 using cursor 252 at step 804. In response to the selection, the selected edge is highlighted (e.g., box 740) and the panels configured on the edge are identified in section 706. At step 806, the user selects a panel. For example, the user can select a panel by selecting an entry in section 706.

The user specifies the properties for an existing or new panel in section 708 and by selecting or deselecting check boxes 716–718. At step 808 (i.e., "configuration operation?"), the type of property specification input (if any) received from the user is determined. If an add operation is received from the user, processing continues at step 810 to display box 752. At step 812, the selection input is received from the user. The selection input specifies an application by selecting one of the entries in box 752 (e.g., Drawer, Gallery, or URL). Input in the form of a URL includes the path or address of an application. Processing continues at step 808 to handle another configuration operation.

If it is determined at step 808 that the user specified a remove, color, or open operation, processing continues at step 814 to perform the requested operation. A remove operation, removes the selected sliding panel. The color operation modifies the color used in the open and closed representations of the selected sliding panel. Similarly, the open options (e.g., hold open and open with mouse button down) specify the manner in which the selected sliding panel is opened or remains open.

The user can exit the configuration UI by either accepting or canceling the modifications made during the configuration session. For example, the user can select button 730 of FIGS. 7A–7B to accept or button 732 to cancel the modifications. If it is determined at step 816 that the user wants to exit the configuration UI and accept the modifications (e.g., the user selects ok using button 730), processing continues at step 818 to update the necessary configuration files (e.g., the configuration files associated with sliding panels modified during the configuration session). A panel's configuration file specifies the properties associated with a panel including the application that runs in the panel, the panel's edge and background color, and the circumstances under which a panel is opened or is closed.

At step 820, GUI 200 is modified to reflect the configuration modifications made by the user. Modifications include those made to new or existing panels. For example, a newly configured panel is added to GUI 200 on the edge specified by the user. The new panel is color-coded as specified in dialog 720. To illustrate further, a modified color coding can be reflected in an existing panel's graphical representation.

In the preferred embodiment, GUI 200 is managed by a mechanism referred to as a selector. The selector is a software application that manages switch 214. The selector displays a single workspace in display area 224. A user can move between workspaces by making a selection in switch 214. The state of a workspace is saved when it is switched out and is restored when it is switched back in. Thus, the application(s) running in a workspaces are effectively always running. There is no need to start and stop an application.

The selector generates sliding panel graphic representations using the configuration files. In addition to the configuration files, a sliding panel's graphic representation depends on the number of other panels that are configured for the same edge. For example, a lone panel on an edge runs the length of the edge in its closed state. If another panel is added to the edge, the original panel's bounds comprise half the length of the edge. Similarly, the addition of a third panel reduces the size of each panel to one-third of the edge. The selector manages the sliding panels using the configuration information set by the user and the runtime information.

Figure 9A:
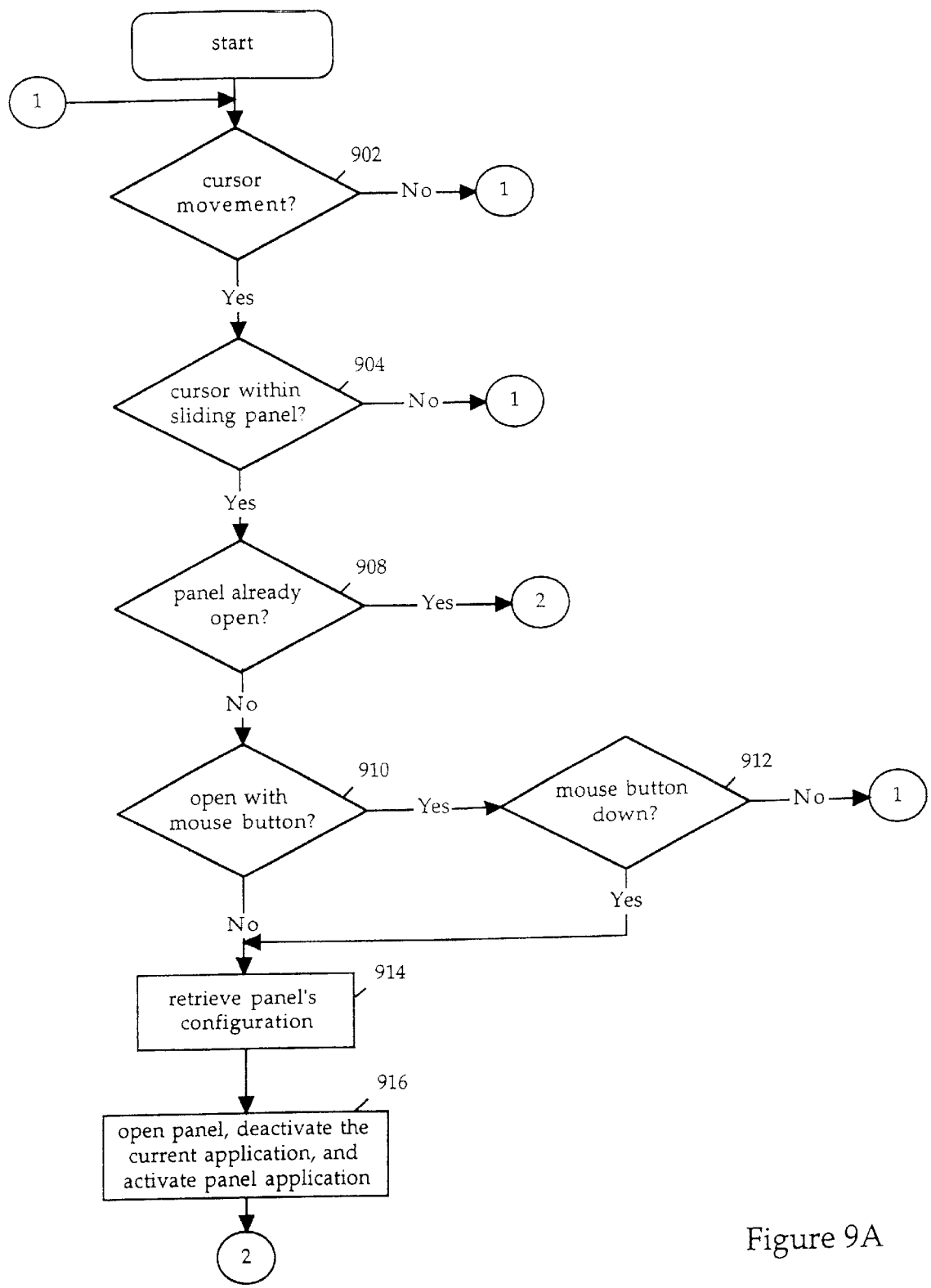
FIGS. 9A–9B provide a panel management process flow according to an embodiment of the invention.
Figure 9B:
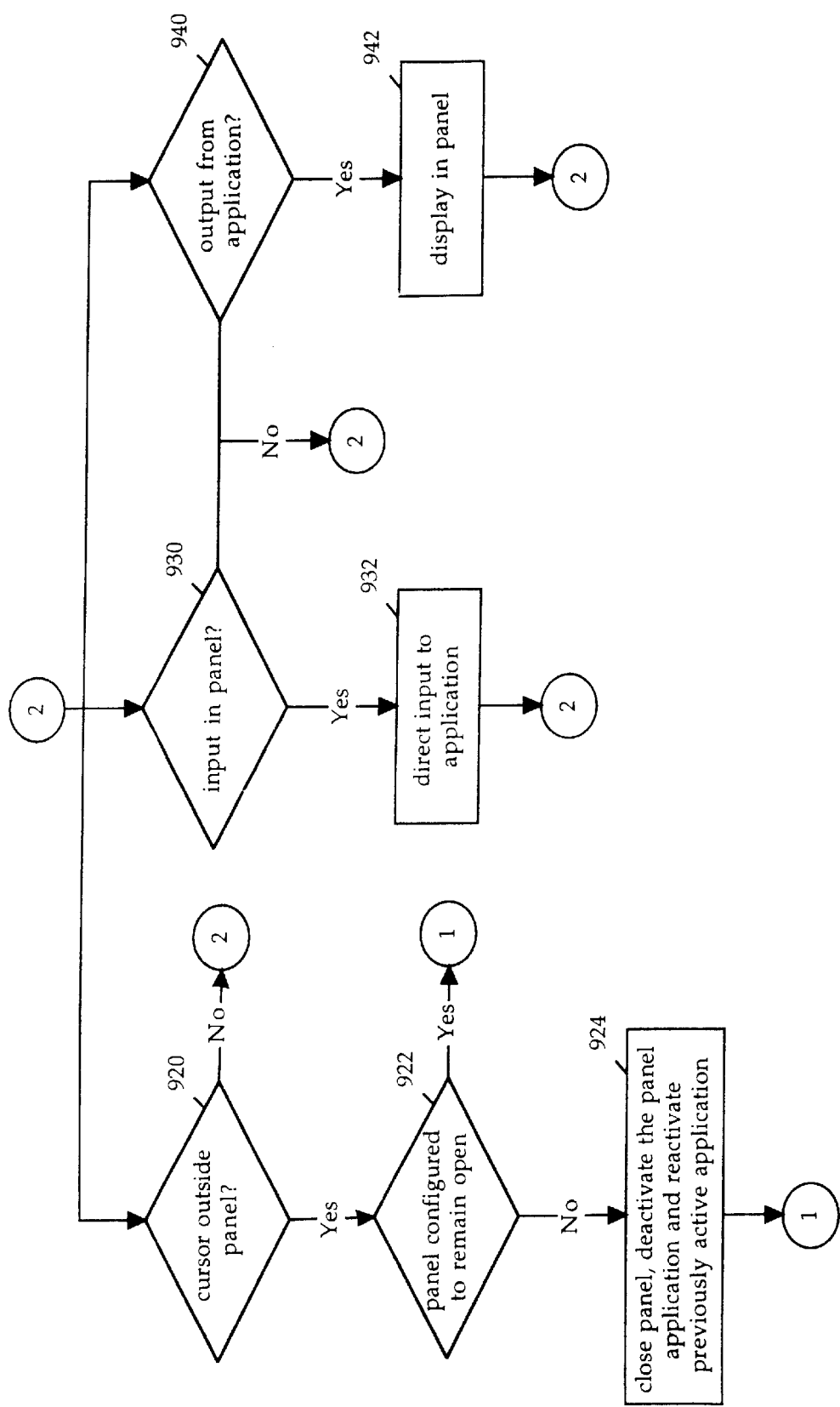

The selector monitors the movement cursor 252 and opens a closed sliding panel when cursor 252 comes in contact with the sliding panel's GUI closed representation. When the cursor is moved outside an open sliding panel, the selector closes the sliding panel if the panel's configuration specifies that it should be closed. FIGS. 9A–9B provides a panel management process flow according to an embodiment of the invention.

At step 902 (i.e., "cursor movement?"), a determination is made whether cursor movement is detected. If not, processing continues at step 902 to wait for cursor movement. If cursor 252 is moved, processing continues at step 904. A determination is made at step 904 whether cursor 252 is within a sliding panel. If not, processing continues at step 902 to monitor movement of cursor 252.

If it is determined at step 904 that the cursor is within a sliding panel, processing continues at step 908. At step 908 (i.e., "panel already open?"), a determination is made whether the panel is already open. If so, processing continues to manage activity within the sliding panel at steps 920, 930, and 940. If the sliding panel is not already open, processing continues at step 910 to determine whether the sliding panel is configured to open only when the mouse button is depressed. If so, processing continues at step 912 to determine whether the mouse button is depressed. If it isn't, processing continues at step 902 to monitor cursor movement.

If it is determined (at step 910) that the sliding panel is not configured to open with the mouse button, or that the mouse button was used according to the panel's configuration (at step 912) processing continues at step 914 to retrieve the panel's configuration information. The information can reside in memory or in the panel's configuration file, for example. At step 916, the sliding panel is opened, the application that is currently running is deactivated and the application that runs in the sliding panel is activated. If another sliding panel that is "held open" (i.e., configured to remain open) in GUI 200, sliding panel can be opened in front of the "held open" panel.

Since the application that is configured to run in the sliding panel is automatically activated in the open sliding panel, the user can interact with the application. FIG. 9B provides a process flow for managing the user's interactions with the sliding panel's application. The type of input received from the user is determined at steps 920, 930 and 940. If, for example, the user enters application information using the keyboard or the mouse, processing continues at step 932 to direct the input to the application. If it is determined at step 940 that the application generated output for display in the sliding panel, the output is displayed in the sliding panel.

At step 920, a determination is made whether cursor 252 is outside the sliding panel's open representation (e.g., sliding panel 216B in FIG. 6). For example, cursor 252 can move outside panel 216B by moving into a portion of display area 224 not covered by panel 216B in FIG. 6. Further, cursor 252 can move outside panel 216B by moving into the closed representation of another sliding panel that is visible in GUI 200 (e.g., sliding panel 216A or sliding panel 216C).

If cursor 252 moves outside the open sliding panel, processing continues at step 922 to determine whether the sliding panel is to be closed. At step 922, a determination is made whether the sliding panel is configured to remain open if the cursor is moved outside the bounds of the sliding panel. If it is to remain open, processing continues at step 902 to continue monitoring cursor movement. If the sliding panel is configured to close when the cursor 252 is outside the panel, processing continues at step 924 to close the panel. The application configured to run in the closed panel is deactivated and the application that was running when the panel was opened is reactivated. Processing continues to monitor cursor movement at step 902.

Thus, a method and apparatus for configuring sliding panels has been provided.

What is claimed is:

1. A method for configuring a sliding panel in a graphical user interface (GUI) of a computer system, comprising:

providing a configuration application for defining a sliding panel configuration;

accessing the configuration application through a selector module;

defining sliding panel configuration properties, the defining including;

selecting a workspace from a plurality of workspace options to be defined within the GUI;

associating an edge of the GUI with the sliding panel;

associating an application with the sliding panel; and associating a behavior criteria with the sliding panel; and generating a sliding panel graphic representation from the sliding panel configuration properties, wherein the sliding panel graphic representation allows for switching between the plurality of workspace options.

2. The method of claim 1 wherein said configuration is preserved in persistent storage.

3. The method of claim 1 wherein said configuration further compromises selecting a visual indicator for the background of said sliding panel and assigning said visual indicator to said representation of said sliding panel.

4. The method of claim 1 wherein said selector module is activated by a mouse button.

5. The method of claim 1 wherein said representation remains visible in said GUI.

6. The method of claim 1 wherein said application associated with said sliding panel comprises a switch application allowing for movement between the plurality of workspace options.

7. The method of claim 1 wherein said application associated with said sliding panel compromises a program path.

8. The method of claim 1 wherein said application associated with said sliding panel comprises a Uniform Resource Locator.

9. The method of claim 1 wherein said behavior criteria comprises:

specifying a first event to denote opening said sliding panel;

specifying a second event to denote closing said sliding panel.

10. The method of claim 1 wherein said behavior criteria comprises locking said sliding panel to said GUI.

11. The method of claim 1 wherein said behavior criteria comprises cursor events comprising:
opening said sliding panel when a cursor moves inside said representation of said sliding panel; and
closing said sliding panel when said cursor moves outside said representation of said sliding panel.

12. The method of claim 11 wherein said opening said sliding panel further comprises;
retrieving said sliding panel's assigned said configuration;
opening said sliding panel when said sliding panel is to be open;
activating said application associated with said sliding panel when said application is to be activated.

13. The method of claim 11 wherein said closing said sliding panel further comprises:
retrieving said sliding panel's assigned said configuration;
closing said sliding panel when said sliding panel is to be closed;
deactivating said application associated with said sliding panel when said application is to be deactivated.

14. The method of claim 1 wherein said behavior criteria comprises activating said application in said sliding panel when said sliding panel is opened.

15. The method of claim 1 wherein said behavior criteria comprises deactivating said application in said sliding panel when said sliding panel is closed.

16. A method for a user to configure a plurality of sliding panels in a graphical user interface (GUI) of a computer system, the GUI having a plurality of workspace options, comprising:
selecting a representation of at least one of a plurality of sliding panels through a configuration application;
interacting with a selector module accessed through the configuration application, the selector module enabling creation of independent configurations for said at least one of a plurality of sliding panels, said interacting comprising:
associating an edge of said GUI with said at least one of a plurality of sliding panels;
associating an application with said at least one of a plurality of sliding panels;
associating a behavior criteria with said at least one of a plurality of sliding panels; and
saving said configuration for said representation of said at least one of a plurality of sliding panels on said GUI, wherein said configuration allows for switching between the plurality of workspace options.

17. The method of claim 16 wherein said at least one of a plurality of sliding panels is individually configured, and furthermore where said at least one of a plurality of sliding panels is associated with independent behavior criteria.

18. A computer readable medium having program instructions for configuring a sliding panel in a graphical user interface (GUI) of a computer system, comprising:
program instructions for providing a configuration application for defining a sliding panel configuration;
program instructions for accessing the configuration application through a selector module;
program instructions for defining sliding panel configuration properties, the program instructions for defining including;
program instructions for selecting a workspace from a plurality of workspace options to be defined within the GUI;
program instructions for associating an edge of the GUI with the sliding panel;
program instructions for associating an application with the sliding panel; and
program instructions for associating a behavior criteria with the sliding panel; and
program instructions for generating a sliding panel graphic representation from the sliding panel configuration properties, wherein the sliding panel graphic representation allows for switching between the plurality of workspace options.

19. The computer readable medium of claim 18 wherein said configuration further compromises:
program instructions for selecting a visual indicator for the background of said sliding panel and assigning said visual indicator to said representation of said sliding panel.

20. The method of claim 18 wherein said program instructions for associating a behavior criteria with the sliding panel comprises:
program instructions for specifying a first event to denote opening said sliding panel;
program instructions for specifying a second event to denote closing said sliding panel.

* * * * *